US009928839B1

(12) United States Patent
Lester et al.

(10) Patent No.: US 9,928,839 B1
(45) Date of Patent: Mar. 27, 2018

(54) SYSTEMS AND METHODS FOR AUTHENTICATION USING VOICE BIOMETRICS AND DEVICE VERIFICATION

(71) Applicant: United Services Automobile Association (USAA), San Antonio, TX (US)

(72) Inventors: Michael Wayne Lester, San Antonio, TX (US); Debra Randall Casillas, Helotes, TX (US); Sudarshan Rangarajan, San Antonio, TX (US); John Shelton, San Antonio, TX (US); Maland Keith Mortensen, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 0 days.

(21) Appl. No.: 14/254,504

(22) Filed: Apr. 16, 2014

Related U.S. Application Data

(60) Provisional application No. 61/911,773, filed on Dec. 4, 2013.

(51) Int. Cl.
*G10L 15/00* (2013.01)
*G10L 17/00* (2013.01)
(52) U.S. Cl.
CPC .................................. *G10L 17/00* (2013.01)

(58) Field of Classification Search
CPC . G03G 15/5075; G03G 21/20; H04N 1/00976
See application file for complete search history.

(56) References Cited

U.S. PATENT DOCUMENTS

| | | | | |
|---|---|---|---|---|
| 5,664,058 | A * | 9/1997 | Vysotsky | G10L 15/075 704/238 |
| 5,666,400 | A * | 9/1997 | McAllister | H04Q 3/0029 379/189 |
| 7,039,951 | B1 | 5/2006 | Chaudhari et al. | |
| 8,543,834 | B1 * | 9/2013 | Barra | G06F 21/32 713/182 |
| 8,838,985 | B1 * | 9/2014 | Robbins | H04B 1/38 340/851 |
| 9,032,498 | B1 * | 5/2015 | Ben Ayed | H04W 12/06 726/9 |
| 2003/0046072 | A1 | 3/2003 | Ramaswamy | |
| 2007/0143117 | A1 * | 6/2007 | Conley | G10L 15/22 704/275 |
| 2008/0243501 | A1 | 10/2008 | Hafsteinsson et al. | |
| 2010/0115610 | A1 | 5/2010 | Tredoux | |
| 2010/0158207 | A1 | 6/2010 | Dhawan | |

(Continued)

*Primary Examiner* — Kevin Ky
(74) *Attorney, Agent, or Firm* — Fish & Richardson P.C.

(57) ABSTRACT

Methods and systems for authenticating a user are described. In some embodiments, a one-time token and a recording of the one-time token is read aloud by the user. The voice characteristics derived from the recording of the one-time token are compared with voice characteristics derived from samples of the user's voice. The user may be authenticated when the one-time token is verified and when a match of the voice characteristics derived from the recording of the one-time token and the voice characteristics derived from the samples of the user's voice meet or exceed a threshold.

30 Claims, 8 Drawing Sheets

(56) References Cited

U.S. PATENT DOCUMENTS

| | | | |
|---|---|---|---|
| 2012/0249328 A1* | 10/2012 | Xiong | G10L 15/22 340/541 |
| 2013/0097682 A1* | 4/2013 | Zeljkovic | H04L 9/3231 726/7 |
| 2013/0132091 A1* | 5/2013 | Skerpac | G10L 17/005 704/273 |
| 2013/0247165 A1* | 9/2013 | Pal | H04L 63/08 726/10 |
| 2014/0289833 A1* | 9/2014 | Briceno | H04L 63/08 726/7 |

* cited by examiner

SYSTEMS AND METHODS FOR AUTHENTICATION USING VOICE BIOMETRICS AND DEVICE VERIFICATION

CROSS-REFERENCE TO RELATED APPLICATIONS

This application is a non-provisional of and claims priority to U.S. Provisional Application No. 61/911,773, filed on Dec. 4, 2013, entitled "SYSTEMS AND METHODS FOR AUTHENTICATION USING VOICE BIOMETRICS AND DEVICE VERIFICATION," which is hereby incorporated by reference in its entirety for all purposes.

TECHNICAL FIELD

Various embodiments of the present disclosure generally relate to authentication. More specifically, various embodiments of the present disclosure relate to methods and systems for authentication using voice biometrics and device verification.

BACKGROUND

The protection and security of customer information is vital from an organization's perspective, not only to comply with applicable laws, but to earn and keep customer's trust. Enhanced security often comes at the cost of convenience for the user. For example, customers may be required to answer additional security questions.

Security analysts have identified three authentication factors that can be used in making a positive identification: ownership (something only the user has), knowledge (something only the user knows), and inherence (something only the user is). Elements used to verify the first factor, ownership, may include a phone, a security token, or a software token. Elements used to verify the knowledge factor may include a password, username, personal identification number (PIN) or answers to security questions. Elements used to verify the inherence factor may include biometric data.

SUMMARY

Methods and systems for authenticating a user are described. In some embodiments, a one-time token and a recording of the one-time token read aloud by the user are received at an authentication engine. The voice characteristics derived from the recording of the one-time token may be compared to the voice characteristics derived from samples of the user's voice. The samples of the user's voice may be derived from any vocal interaction with the user (e.g., speaking with a representative, speaking commands at an interactive voice response system, etc.). The user may be authenticated when the one-time token is verified and when a match of the voice characteristics derived from the recording of the one-time token and the voice characteristics derived from the previously recorded verbal samples of the user's voice meet or exceed a threshold.

In other embodiments, a biometric sample collected at a computing device that incorporates a dynamically generated token is received from a computing device. The biometric sample may be compared with a previously collected biometric sample. The user may be authenticated when the computing device is successfully verified and when the user is successfully verified though a match of the biometric sample and the previously collected biometric sample.

In other embodiments, a method includes displaying a one-time token on a mobile computing device that is to be read aloud by the user. The method further includes generating a file including a recording of the one-time token read aloud by the user and transmitting the one-time token and the recording of the one-time token read aloud by the user to a server associated with an organization. A computing system of the organization may compare voice characteristics of the recording of the one-time token with voice characteristics of previously recorded samples of the user's voice, and the user may be authenticated to the mobile application when the voice characteristics of the recording of the one-time token match the voice characteristics of the previously recorded samples of the user's voice.

Systems and apparatuses (e.g., non-transitory mediums embodying instructions that can be executed by one or more processors) that can accomplish the operations described above are also discussed in the disclosure.

While multiple embodiments are disclosed, still other embodiments will become apparent to those skilled in the art from the following detailed description, which shows and describes illustrative embodiments. As will be realized, embodiments of the present disclosure are capable of modifications in various aspects, all without departing from the scope of the present disclosure. Accordingly, the drawings and detailed description are to be regarded as illustrative in nature and not restrictive.

BRIEF DESCRIPTION OF THE DRAWINGS

Embodiments of the present disclosure will be described and explained through the use of the accompanying drawings in which.

Figure 1:
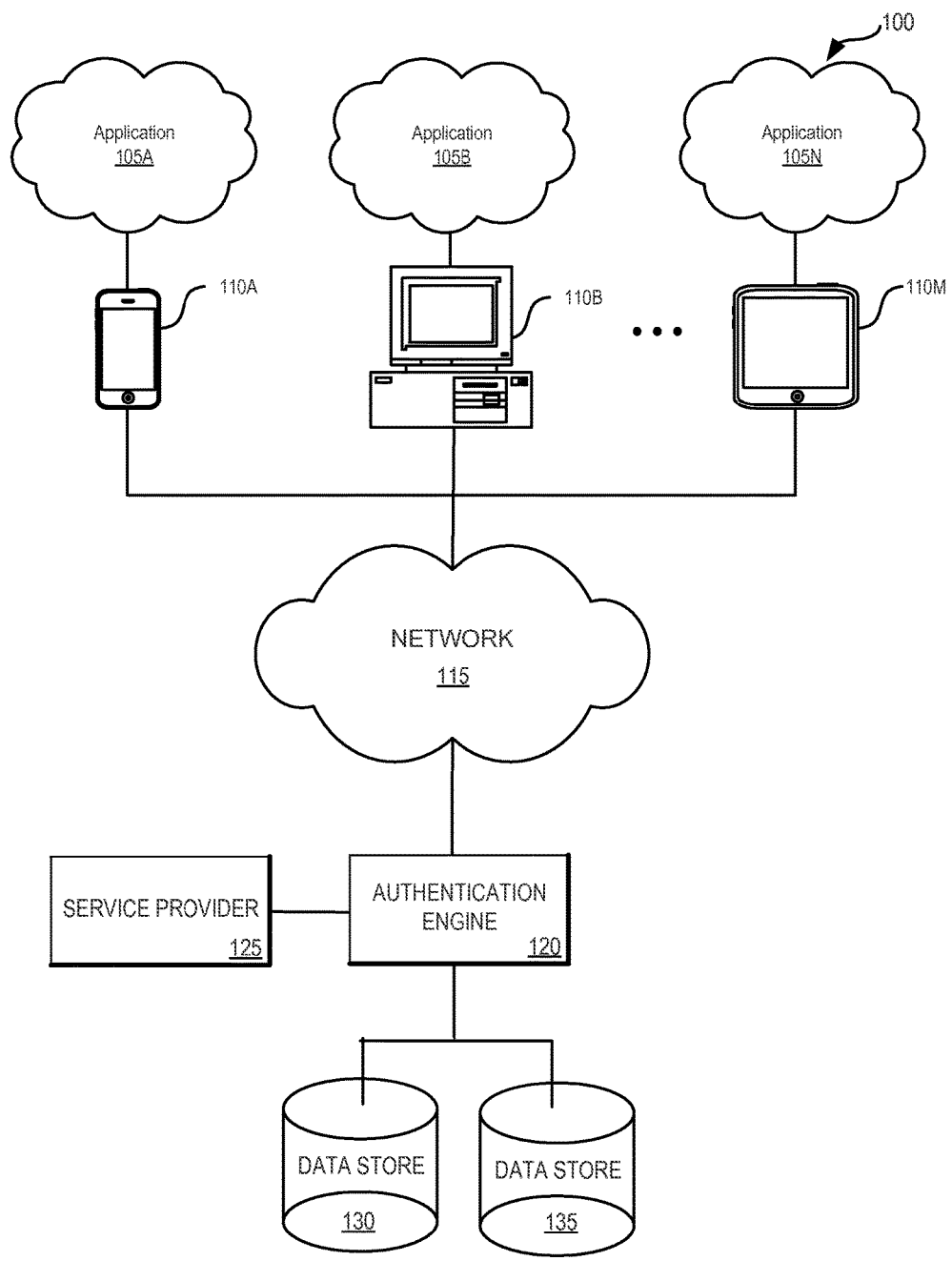
FIG. 1 illustrates an example of a network-based operating environment in accordance with various embodiments of the disclosure.

The drawings have not necessarily been drawn to scale. For example, the dimensions of some of the elements in the figures may be expanded or reduced to help improve the understanding of the embodiments of the present disclosure. Similarly, some components and/or operations may be separated into different blocks or combined into a single block for the purposes of discussion of some of the embodiments of the present disclosure. Moreover, while embodiments of the present disclosure are amenable to various modifications and alternative forms, specific embodiments have been shown by way of example in the drawings and are described in detail below. The intention, however, is not to limit the disclosure to the particular embodiments described. On the contrary, the disclosure is intended to cover all modifications, equivalents, and alternatives falling within the scope of the disclosure.

DETAILED DESCRIPTION

Various embodiments of the present disclosure generally relate to authentication. More specifically, various embodiments of the present disclosure relate to methods and systems for authentication using voice biometrics and device verification.

Security and data protection are becoming increasingly important. Unfortunately, customers may become annoyed with extra steps or additional information required for authentication. According to some embodiments, a user can be authenticated using multi-factor authentication with minimal impact to the user by integrating the authentication factors in such a way that the user does not easily realize multiple factors are being submitted. "Two-factor authentication," (verifying two of the factors) may be used in authenticating a user. For example, many applications on mobile devices require the user to enter a PIN, satisfying the knowledge factor, on a particular mobile device, satisfying the ownership factor.

In another example, in some embodiments, a token may be generated at the mobile device. The token may be used to provide an ownership factor (used to verify the device) when the token is automatically verified and an inherence factor (used to verify what the person is) by having the user read the token aloud. The user does not necessarily realize that multiple authentication factors are being used because they are asked to perform one task (i.e., read the token). The user's registered device can be verified using a token, one-time token, certificate, device fingerprint, or other forms of uniquely identifying a mobile device generated (e.g., based on device characteristics) at the user's registered device. In addition, the voice of the user can be used as part of a user verification based on biometrics gathered by the device.

In order to verify the user's registered device, a token may be generated at the user's device. In some embodiments, the token may be a one-time token meaning that the token is not the same every time the token is generated. In some embodiments the token changes at certain intervals (e.g., every 30 seconds) or based on the user's location (e.g., changes when GPS data indicates a move of a certain distance). The token may be generated by a token generator. The token may be generated based on the user's location or based on information collected from the user's device. For example, if the device is a mobile phone, a last-dialed or last-call received phone number may be used as the token. In other embodiments, an email address or portion thereof of a last sent or received email may be used as the token.

In some embodiments, a device may be registered with an organization for multi-factor authentication. During the registration process, a device may download a token generator with an associated token ID (e.g., Credential ID by Verisign®). The token generator may generate one-time tokens used to verify the device. In some embodiments, the token generator uses a shared secret and a time stamp to generate the one-time token. The tokens may be one-time in the sense that the token changes after a period of time. When the device is being verified, the token, token ID, and a time stamp (among other information) are transferred to the organization or to a service provider. The organization or service provider can use the token ID and the time stamp to determine a correct one-time token. The correct token can be matched to the transferred token to verify the device.

Once the device is verified, the person may be verified using voice biometrics. The user may have previously provided voice samples to the organization. In some embodiments, the voice samples include phrases or words that can be used in a token, such as spoken numbers. During registration, a voice fingerprint may be created. During authentication, the user's voice may be compared to the voice fingerprint. The voice fingerprint includes unique attributes and characteristics of an individual's voice.

Once the device is verified and the person's voice is determined to sufficiently match the pre-recorded version or finger print of the user's voice speaking the token, the person may be authenticated or admitted to the mobile application, website, electronic safe, room, or other medium. In some embodiments, the person's voice cannot be matched to the degree necessary. In those cases, the person may be asked to provide (by speaking or keying in) additional authenticating information such as a personal identification number, member number, a video stream, etc. In some embodiments, the person may simply be asked to speak a different token. In yet other embodiments the user may be asked to share GPS, video, take a photo, etc.

In some embodiments, the device verification takes place simultaneously with the voice verification. For example, a device token may be submitted via a person reading the device token out loud. In such cases, the device and the person may be authenticated as part of the same step.

Two types of authenticating voice biometrics may be used during authentication: text-dependent authentication and text-independent authentication. In text-dependent authentication, a person has previously stated a specific phrase or portions of a specific phrase in an enrollment process. The previously captured spoken phrase is then used to authenticate the person by comparing the voice biometrics of the previously spoken phrase to the voice biometrics of the current phrase. Text-independent authentication does not require that the user has previously spoken a particular phrase but does require previous conversation(s) with the user to be recorded and used to create a voice fingerprint. Text-dependent authentication currently results in a lower false positive identification rate. Additionally, text-dependent authentication requires less spoken text for successful identification. However, the challenge with using text-dependent authentication is that the person is required to have previously spoken the phrase to the authenticating entity. In some embodiments, this may result in the person speaking the same words over and over and potentially giving away important information such as a personal identification number.

In some embodiments, a person speaks a series of morphemes, words, phrases, clauses, sentences, numbers, etc. (e.g., one, two, three, etc.) that can be combined numerous ways such that the user can be authenticated using those words without having to state the same morphemes, words, phrases, clauses, sentences, numbers, etc. over and over to be authenticated. In an example, the person can speak "zero, one, two, three, four, five, six, seven, eight, nine" several times to the authenticating entity prior to requesting authentication to develop a voice profile of how the user typically speaks the words. During authentication, a token using some combination of the pre-recorded words "zero, one, two, three, four, five, six, seven, eight, nine" may be displayed on the person's device for the person to speak in the device.

The combination of words may be of a fixed length, a variable length, may span the entire word space, and/or only be a subset thereof. The previously recorded samples of the person saying these words may be used to create a voice profile that can be used to generate an authentication decision. For example, the recorded samples may be directly compared with the current version of the person stating the words. If the previously recorded samples match the current version to a certain level, the person may be authenticated or the approved match may be used as a factor to authenticate the person. As another example, the recorded samples may be indirectly used by creating a voice profile. As a result, even words, phrases, or numbers not previously recorded but that are currently spoken can be evaluated to determine if the person can be successfully authenticated.

Voice biometrics are specifically discussed in many examples in the description as part of a two-factor authentication, but these examples are not meant to be limiting. Rather, other types of biometric information and multiple additional factors may be used to authenticate the user in connection with the device authentication. For example, the application may generate a token (e.g., one-time token) which the user is asked to read aloud. However, instead of just recording the user's voice, the system may record a video. Then, in addition to voice biometrics and token authentication, facial recognition can be used as part of a multi-factor authentication.

In the following description, for the purposes of explanation, numerous specific details are set forth in order to provide a thorough understanding of embodiments of the present disclosure. It will be apparent upon reading the disclosure, however, to one skilled in the art that embodiments may be practiced without some of these specific details.

Moreover, the techniques introduced here can be embodied as special-purpose hardware (e.g., circuitry), as programmable circuitry appropriately programmed with software and/or firmware, or as a combination of special-purpose and programmable circuitry. Hence, embodiments may include a machine-readable medium having stored thereon instructions that may be used to program a computer (or other electronic devices) to perform a process. The machine-readable medium may include, but is not limited to, floppy diskettes, optical disks, compact disc read-only memories (CD-ROMs), magneto-optical disks, ROMs, random access memories (RAMs), erasable programmable read-only memories (EPROMs), electrically erasable programmable read-only memories (EEPROMs), magnetic or optical cards, flash memory, or other type of media/machine-readable medium suitable for storing electronic instructions.

FIG. 1 illustrates an example of a network-based operating environment 100 in which some embodiments of the present disclosure may be used. As illustrated in FIG. 1, operating environment 100 may include applications 105A-105N running on one or more computing devices 110A-110M (such as a mobile device, a mobile phone, a tablet computer, a mobile media device, a mobile gaming device, a vehicle-based computer, a dedicated terminal, a public terminal, desktop, or laptop computer, a kiosk, etc.). In some embodiments, applications 105A-105N may be stored on the computing device or may be stored remotely. These computing devices can include mechanisms for receiving and sending traffic by connecting through network 115 to authentication engine 120, service provider 125, and data stores 130 and 135

Computing devices 110A-110M may be configured to communicate via the network 115 with authentication engine 120 and service provider 125. In some embodiments, computing devices 110A-110M can retrieve or submit information to authentication engine 120 and run one or more applications with customized content retrieved by authentication engine 120, service provider 125, and data stores 130 and 135. For example, computing devices 110A-110M can execute a browser application or a customized client to enable interaction between the computing devices 110A-110M and authentication engine 120, service provider 125, and data stores 130 and 135.

Network 115 can include any combination of local area and/or wide area networks, using both wired and wireless communication systems. In one embodiment, network 115 uses standard communications technologies and/or protocols. Thus, network 115 may include links using technologies such as Ethernet, 802.11, worldwide interoperability for microwave access (WiMAX), 3G, 4G, CDMA, digital subscriber line (DSL), etc. Similarly, the networking protocols used on network 115 may include multiprotocol label switching (MPLS), transmission control protocol/Internet protocol (TCP/IP), User Datagram Protocol (UDP), hypertext transport protocol (HTTP), simple mail transfer protocol (SMTP) and file transfer protocol (FTP). Data exchanged over network 115 may be represented using technologies and/or formats including hypertext markup language (HTML) or extensible markup language (XML). In addition, all or some links can be encrypted using conventional encryption technologies such as secure sockets layer (SSL), transport layer security (TLS), and Internet Protocol security (Ipsec).

Authentication engine 120 can be running on one or more servers and can be used to authenticate users to a mobile application, website, to perform a specific activity, or for other activities. Authentication engine 120 may be communicably coupled with service provider 125, data stores 130 and 135, and computing devices 110A-110M and may communicate, access or receive data (e.g., tokens, verification information, voice authentication services, etc.) from computing devices 110A-110M, service provider 125, and data stores 130 and 135. Authentication engine 120 may be associated with a membership organization, and the users may be members or potential members of the membership organization. The organization may be a financial institution and/or an insurance company.

Authentication may be based on information received through various user interfaces running on computing devices 110A-110M, service provider 125, or other interactions, communications, and/or other inputs (e.g., e-mails, tokens, and/or communications via other channels). Authentication engine 120 can be calibrated/configured by individual companies or service providers based on risk tolerance and/or other business objectives to authenticate users.

In some cases, authentication to the application, process, website, or activity may be based on different criteria. For example, in addition to rendering an authentication decision, authentication engine 120 may be configured to compute a risk profile or score. That profile may be used by itself to make a decision, or it may be used in conjunction with other profiles, scores, and/or business practices. Authentication engine 120 may also be configured to recommend an access level the user should be granted. In some embodiments, authentication engine 120 includes various data processing and analytic tools that allow for implementation, creation, and evaluation of users and user information retrieved from data stores 130 and 135.

Service provider 125 may be a security service provider, voice verification analyzer, or other entity that may analyze, process, or provide information for authenticating users. Service provider may communicate with computing device 110A-110M and authentication engine 120 to determine whether the user should be authenticated. For example, service provider 125 may provide a token generator to computing devices 110A-110M and communicate with authentication engine 120 to authenticate the user.

The data stores 130 and 135 can be used to manage storage and access to user data such as registered user devices, user identifications, voice profiles, token IDs, financial information, authentication history, user preferences, member identification numbers, device fingerprints, personal identification numbers, and other information. Data stores 130 and 135 may be a data repository of a set of integrated objects that are modeled using classes defined in database schemas. Data store may further include flat files that can store data. Authentication engine 120 and/or other servers may collect and/or access data from the data stores 130 and 135.

Figure 2:
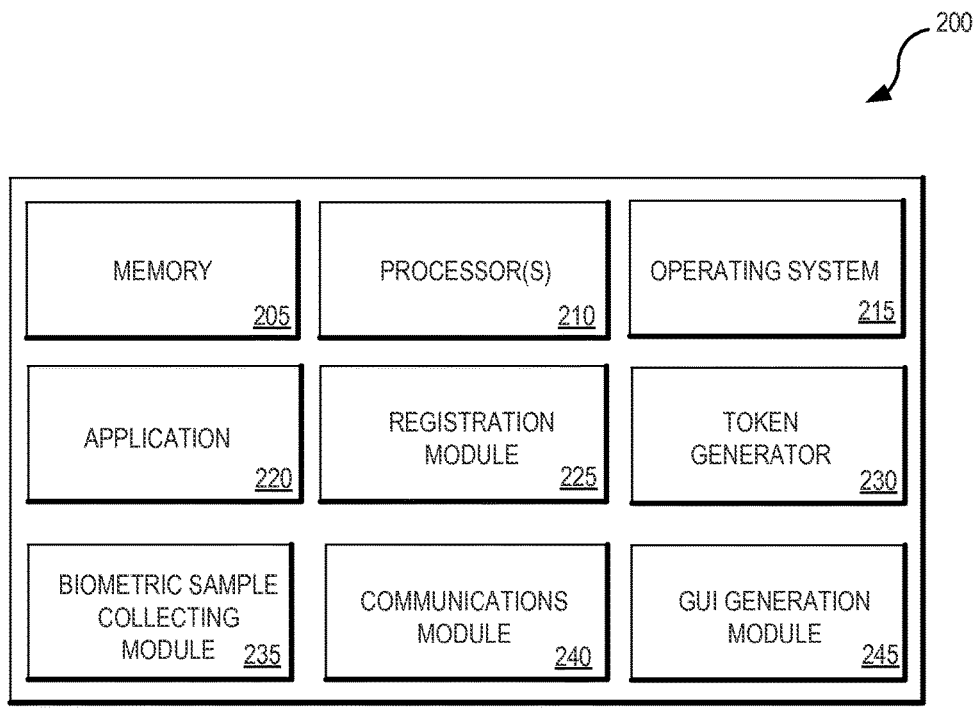
FIG. 2 illustrates various components of a computing device that may be used in accordance with one or more embodiments of the disclosure.

FIG. 2 illustrates a set of components 200 within computing device 110 according to one or more embodiments of the present disclosure. According to the embodiments shown in FIG. 2, computing device 110 can include memory 205, one or more processors 210, operating system 215, application 220, registration module 225, token generator 230, biometric sample collecting module 235, communications module 240, and graphical user interface (GUI) module 245. Other embodiments of the present disclosure may include some, all, or none of these modules and components along with other modules, applications, and/or components. Still yet, some embodiments may incorporate two or more of these modules and components into a single module and/or associate a portion of the functionality of one or more of these modules with a different module. For example, in one embodiment, application 220 and registration module 225 can be combined into a single component.

Memory 205 can be any device, mechanism, or populated data structure used for storing information. In accordance with some embodiments of the present disclosure, memory 205 can encompass any type of, but is not limited to, volatile memory, nonvolatile memory, and dynamic memory. For example, memory 205 can be random access memory, memory storage devices, optical memory devices, magnetic media, floppy disks, magnetic tapes, hard drives, SIMMs, SDRAM, DIMMs, RDRAM, DDR RAM, SODIMMS, erasable programmable read-only memories (EPROMs), electrically erasable programmable read-only memories (EEPROMs), compact discs, DVDs, and/or the like. In accordance with some embodiments, memory 205 may include one or more disk drives, flash drives, one or more databases, one or more tables, one or more files, local cache memories, processor cache memories, relational databases, flat databases, and/or the like. In addition, those of ordinary skill in the art will appreciate many additional devices and techniques for storing information which can be used as memory 205.

Memory 205 may be used to store instructions for running one or more applications or modules on processor(s) 210. For example, memory 205 could be used in one or more embodiments to house all or some of the instructions needed to execute the functionality of operating system 215, application 220, registration module 225, token generator 230, biometric sample collecting module 235, communications module 240, and graphical user interface (GUI) module 245.

Operating system 215 can provide a software package that is capable of managing the hardware resources of computing device 110. Operating system 215 can also provide common services for software applications running on processor(s) 210. In accordance with various embodiments, operating system 215 can coordinate resources for multiple applications 220 that allow a user to access and interact with authentication engine 120. For example, application 220 can include a banking application, a money transfer application, a social networking application, a gaming application, and the like.

Application 220 can access a server associated with an organization (e.g., authentication engine 120) to retrieve account details. However, before allowing access, a user of application 220 needs to be authenticated. Traditionally, the authentication process has been cumbersome, requiring a username and password and/or PIN be entered by the user. In contrast, various embodiments provide for a PIN-less and password-less authentication scheme or process that uses a native (or default) application running on the computing device to authenticate the user.

To register the device for the authentication process, registration module 225 may send a request to authentication engine 120. The authentication process may be a two-factor authentication process that verifies the user's device with a token and verifies the user with biometrics. In some embodiments, registration module 225 may install a token generator to generate tokens on the device. In some embodiments, the registration process may include operations such as the operations illustrated in FIG. 4 and described below.

According to some embodiments, when a user launches application 220, token generator 230 generates a token that can be used for authentication. The token may be used by the organization to verify the device (the "what you have" portion of the two-factor authentication). The token generator may be associated with the user and the device and may be assigned a specific token ID. In some embodiments, token generator 230 generates tokens periodically (e.g., every 30 seconds). Thus, in some embodiments, the device may be authenticated by verifying the accuracy of the token. To verify the accuracy of the token, the token ID, token, and the time stamp may be communicated to a service provider and/or the authentication engine without any action of the user.

In some embodiments, a shared secret or other unique identifier is used in generating the token. The shared secret may be a piece of data (e.g., password, passphrase, large number, etc.) known only to the user device and the service provider and may be used to generate the token. For example, a time stamp and a shared secret may be provided to the token generator to generate a token. In some embodiments, the shared secret key may be encrypted and must be decrypted before the token generator generates the token. In some embodiments, the shared secret or unique identifier is stored on the mobile computing device.

In other embodiments, token generator 230 can generate a token based on a variety of information such as, but not limited to, device ID, IP address, application ID, application activity (e.g., send $20, access account, etc.), phone numbers, device characteristics (e.g., memory, processors, etc.), and/or other information. In some embodiments, the token and/or the token ID may be populated and visually displayed on a screen. The token may be used to authenticate the device and further may be used in authenticating the user (e.g., user speaks the token into the device and the user's voice is analyzed or the user's eyes are tracked as the user is reading the token and the user's eye movement is analyzed or the user types the token and the user's typing motion/speed/pressure is analyzed).

Biometric sample collecting module 235 may collect biometric samples from a user to verify the user (the "what you are" portion of the two-factor authentication). The biometric sample may be used by the authentication engine 120 and/or service provider 125 to authenticate the user. Biometric samples that may be collected may include speech, eye movement, behavioral biometrics (e.g., keystrokes), etc.

In some embodiments, voice biometrics can be used in verifying the user. In such cases, the token (e.g., one-time token) generated to verify the device may also be used in the process of authenticating the user using voice biometrics. Biometric sample collecting module 235 may record the user speaking the token and communicate the recording and the token to authentication engine 120 and/or service provider 125 to verify the device and the user. As such, the device may be verified when the token is determined to be accurate and the user may be verified when the user's voice biometrics are validated to a threshold.

Device identification is not limited to only token, but may be based on or include a unique device identifier such as phone number, embedded code, or a device fingerprint based on characteristics of the hardware and or software Communications module 240 can send and receive requests, approvals, and information to authentication engine 120 and service provider 125. For example, communications module 240 may receive a communication that the user's credentials are verified and the user is authenticated. Alternatively, application 220 may receive a communication that the user's credentials are not verified and the user needs to provide additional credentials such as a PIN, password, picture, video, another voice sample, or other authenticating information. The information may include a token, token ID, device fingerprint, biometric samples, username/password, PINs, and other information.

GUI generation module 245 can generate one or more GUI screens that allow for interaction with a user. In at least one embodiment, GUI generation module 245 generates a graphical user interface receiving and/or conveying information to the user. For example, the GUI generation module 245 may display a token to be read aloud by the user during the authentication process.

Figure 3:
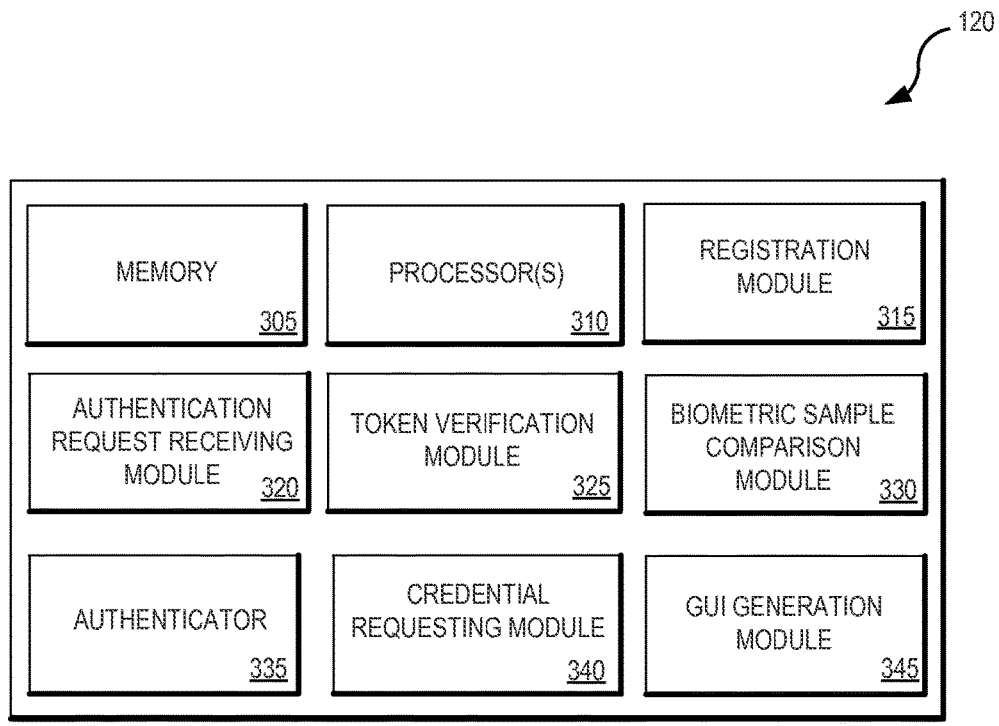
FIG. 3 illustrates various components of an authentication engine that may be used in accordance with various embodiments of the present disclosure.

FIG. 3 illustrates a set of components within authentication engine 120 according to one or more embodiments of the present disclosure. According to the embodiments shown in FIG. 3, authentication engine 120 can include memory 305, one or more processors 310, registration module 315, authentication request receiving module 320, token verification module 325, biometric comparison module 330, authenticator 335, credential requesting module 340, and GUI generation module 345. Other embodiments of the present invention may include some, all, or none of these modules and components along with other modules, applications, and/or components. Still yet, some embodiments may incorporate two or more of these modules and components into a single module and/or associate a portion of the functionality of one or more of these modules with a different module. For example, in one embodiment, authentication request receiving module 320, biometric sample comparison module 330, token verification module 320, and authenticator 335 can be combined into a single module for authenticating the user.

Memory 305 can be any device, mechanism, or populated data structure used for storing information as described above for memory 205. Memory 305 may be used to store instructions for running one or more applications or modules on processor(s) 310. For example, memory 305 could be used in one or more embodiments to house all or some of the instructions needed to execute the functionality of registration module 315, authentication request receiving module 320, token verification module 325, biometric comparison module 330, authenticator 335, credential requesting module 340, and GUI generation module 345.

Registration module 315 can register or enroll a user passively or actively in an authentication scheme or process if the device and/or user has not been registered. Passive authentication includes enrolling the user without the user actively responding to a request for information (e.g., collecting device information or voice biometrics) whereas active authentication includes receiving information from a user who is actively responding to a request (e.g., setting up a username/password, providing personal information such as a date of birth). The authentication process may be a two-factor authentication process that verifies the user's device with a token and verifies the user with biometrics. Registration module 315 may associate the user's device with a user ID, member ID, and/or user profile. In some embodiments, device information such as a phone number, device fingerprint and secure browsing solution may be collected from the device and used for authentication.

Figure 4:
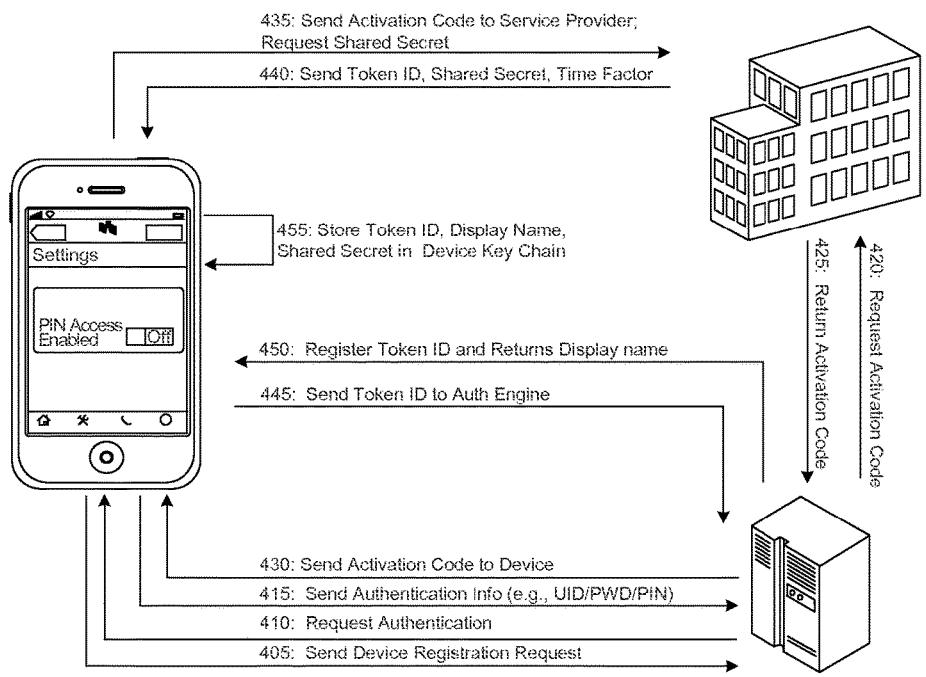
FIG. 4 is a diagram illustrating a registration process flow for registering a device in accordance with various embodiments of the present disclosure.

In some embodiments, as discussed for FIG. 4, a token generator that generates tokens may be installed on the user device as part of a registration process. For example, in some embodiments, a registration module 315 may receive a registration request from a user's computing device. After authenticating the user, registration module 315 may request an activation code for a token generator from a service provider. After receiving the activation code, registration module 315 sends the activation code to the device. Using the activation code, the device may request and receive a token generator, token ID, shared secret, and a time factor from the service provider. Registration module 315 may receive the token ID from the device and register the token ID with the user and/or device. Registration module may return a display name to the device Authentication request receiving module 320 receives a request from a registered computing device to authenticate the user using multi-factor authentication. The request may be a request to authenticate the user to a mobile application, a website, and/or to perform an activity within a mobile application or a website. Authentication request receiving module 320 may identify tokens, time stamps, token IDs, biometric samples, etc. embedded within the request. Authentication request receiving module 320 may send the token ID, time stamp, and token to the token verification module 325 to verify the device by determining the accuracy of the token. Authentication request receiving module may send the biometric sample to the biometric sample comparison module 330 to verify the user using biometric evaluation.

In some embodiments, authentication request receiving module 320 receives the request via other electronic communication mediums (i.e., channels). For example, the electronic communication containing the token can be sent via text message, e-mail, internet relay chat (IRC), file transfer protocol (FTP), hypertext transfer protocol (http), hypertext transfer protocol secure (https), or transmission control protocol/internet protocol (TCP/IP), among others.

Token verification module 325 validates the token. In some embodiments, for example, token verification module 325 compares the token against a second token sent through an alternate channel. In an example, token verification module 325 sends a token, token ID, and time stamp to a service provider for verification of the token. The token is verified by comparing the token generated by the device and communicated to authentication engine 120 with the token that is expected to be generated by that token ID at that time stamp. When the tokens match, the device can be verified. Token verification module 325 communicates the results of the token verification (e.g., verified or not verified) to the authenticator 335.

Biometric comparison module 330 compares biometric samples collected from authentication request receiving module 320 with biometric samples previously collected. Types of biometric samples may include voice, eye movements, and behavioral biometrics, for example. When the biometric samples collected from authentication request receiving module 320 match biometric samples previously collected by authentication engine 120 at or above a certain threshold, the user may be verified. The type of analysis used to compare the samples depends on the type or types of biometrics being used to authenticate the user. For example, if voice biometrics are used to verify the user, characteristics of the voice (e.g., pitch, attenuation, accent, speed, etc.) extracted from the current sample may be compared with the characteristics of the user's voice in the previously recorded samples.

In an embodiment, the previously recorded samples may include phrases or words that the user is requested to speak into the device. Biometric comparison module 330 likely will have a more accurate comparison of the voice in the current sample and the previously recorded samples than if the user had provided a voice sample but no sample of the user speaking the words or phrases. In one embodiment, the user may speak the token into the user device as the biometric sample.

Biometric sample comparison module 330 may use the previously recorded samples of the portions of the token to piece together how the currently spoken token should sound. In some embodiments, biometric sample comparison module 330 generates a model of the voice characteristics of the user. In some embodiments, a model of the voice characteristics of the recording of the token may be generated based on the previously recorded samples of the user's voice. Voice characteristics may include intonation, pitch, cadence, volume, among others. When biometric sample comparison module 330 determines that a match of the user's speech meets or exceeds a certain threshold, the user can be verified. The threshold may depend on the user, the activity the user is requesting (e.g., riskier activities may require a better match), recent account activity, historical behavior of the user, etc. For example, the match threshold may be 90% when the user is requesting a wire transfer whereas the match threshold may only be 50% when a user is requesting an account balance. In some embodiments, the same threshold applies to all users. Biometric comparison module 330 communicates the results of the biometric comparison module (e.g., verified or not verified) to the authenticator 335.

Authenticator 335 can use the information from token verification module 325 and biometric sample comparison module 330 along with other information in making an authentication decision. The decision generated by biometric sample comparison module 330 is used in granting or denying access to an application or website. In some embodiments, the decision generated by biometric sample comparison module 330 is used in granting or denying access to a restricted command. Examples of restricted commands include a command to log a person in to an account, a command to cause a transfer of funds from one account to a second account, and a command accessing restricted data, among others. Examples of accounts that a login command may log a user in to include a social media account, an account at a financial institution, an account at a bank, an account at a credit union, an account at a merchant, an account at a service provider, or an account at a rental provider, among others.

Authenticator 335 can authenticate the user, deny the request for authentication, or request additional credentials based on the results from the token verification module 324, the biometric sample comparison module 330, and/or the type of activity being requested. For example, authenticator 335 may authenticate the user if the token verification module 325 verifies the token and if biometric sample comparison module 330 verifies the biometrics to a certain threshold. Authenticator 335 may deny the request, for example, if the biometric samples do not match to at least a certain level, if fraud has been reported on the user's account, or if the user cannot provide additional authentication information when requested.

When authenticator 335 determines that additional credentials are needed (e.g., the biometric match was close to meeting the level for authentication, the biometric sample was distorted, the service provider is having an outage, etc.), credential requesting module 340 may request additional credentials. The additional credentials can be additional or repeated biometric samples (e.g., the user speaks the token a second time or speaks a new token), a PIN, answering a security question, calling a member service representative, and other. In some embodiments, when the biometrics and token authentication fails, authenticator 335 may attempt to authenticate the user passively, meaning that the user is not required to actively take additional steps to authenticate. For example, authenticator 335 may attempt to geolocate the user using cell phone triangulate or other methods. If the user is in an expected location, the user may be authenticated even if the biometric authentication was unsuccessful.

In some embodiments, a sliding scale may be used to determine if passive authentication is appropriate. For example, if the biometric match is close to the threshold, then the supplemental passive authentication may be used to authenticate the user. On the other hand, if the biometric match was not close, then the user may be denied the authentication request and/or asked for more intrusive information such as a social security number.

GUI generation module 345 is similar to GUI generation module 245. GUI generation module 355 can generate one or more GUI screens that allow for interaction with a user of the authentication engine 120. In at least one embodiment, GUI generation module 345 generates a graphical user interface allowing a user of the mobile device to set preferences, authentication standards, rules, constraints, customize messages, and/or otherwise receive or convey information to the user.

FIG. 4 is a diagram illustrating a registration process flow for registering a device in accordance with some embodiments of the present disclosure. Other registration processes are contemplated. The steps shown in FIG. 4 are one example of a specific registration process. The steps illustrated in FIG. 4 may be performed by one or more components, devices, or modules such as, but not limited to, computing devices 110A-110M, authentication engine 120, processor 210, or other components or device. In some embodiments, fewer than all of the steps are performed, whereas in other embodiments additional operations are performed. Moreover, in some embodiments, the operations may be performed in different orders.

An authentication engine associated with an organization receives a request from a user device to register the device for token-based authentication in 405. The request may be responsive to the user clicking on a mobile application, downloading a mobile application, and/or receiving an invitation to participate in the token-based authentication. The authentication engine may collect and store information about the device (device fingerprint, phone number if applicable, etc.) in a database and associate this information with the user.

Next, in step 410, the authentication engine sends an authentication request to the user device requesting user authentication information (e.g., user or member identification number, password, PIN, etc.). The user and/or user device communicates the requested authentication information to the authentication engine in step 415. Simultaneously with the user's registration request or when the user has provided sufficient authentication information, the authentication engine requests an activation code for a token generator from a service provider in step 420. The service provider returns the activation code to the authentication engine in step 425. The authentication engine sends the activation code to the user device in step 430.

Upon receiving the activation code, the user device communicates the activation code to the service provider in step 435. After receiving the activation code, the service provider returns a shared secret and a serial number (token ID) for a token generator to the user device in step 440. The user device sends the token ID to the authentication engine in step 445. In step 450, the authentication engine associates the token ID with the member/user. The organization may also return a display name of the token ID. The token ID, display name, and shared secret are stored in a key chain of the user device in step 455. The shared secret may be encrypted. The token ID may be embedded in an application or downloaded as a separate application. The display name may be the user's name (e.g., first name) or other identifier that verifies to the user that the user is registered. In some embodiments, the display name may send a message such as "Welcome back John."

Figure 5:
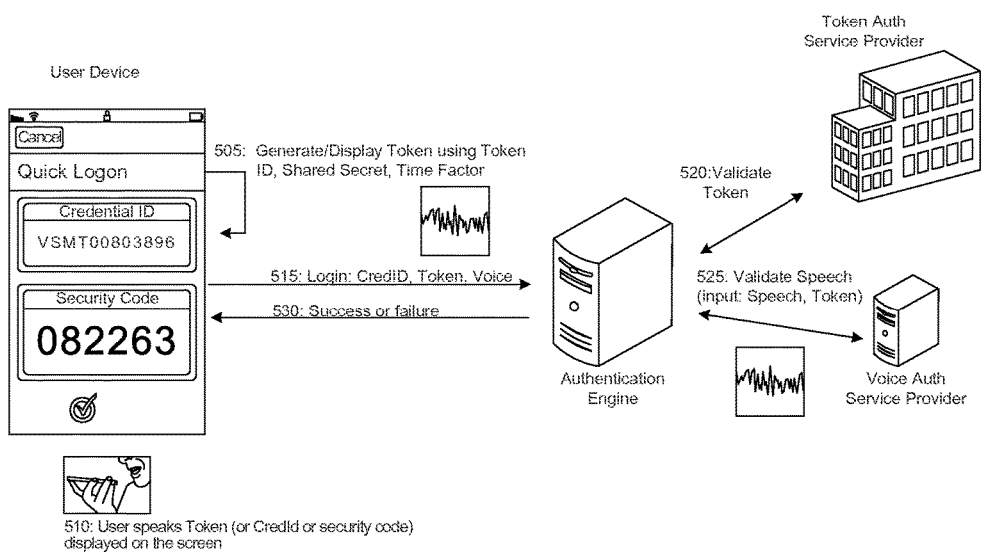
FIG. 5 is a diagram illustrating an authentication process flow that may be used in authenticating a user in accordance with various embodiments of the disclosure.

FIG. 5 is a diagram illustrating an authentication process flow that may be used in authenticating a user in accordance with various embodiments of the disclosure. In step 505, the user device generates and displays a token (or passcode). The token may be generated using a token ID, shared secret, and a time factor. In step 510, the user speaks the token that is displayed on the device. The device creates a recording of the user's voice speaking the token. In step 515, the device sends the token ID, token, and the recording of the user's voice to an authentication engine (or other device associated with an organization) and/or a request to be authenticated.

In step 520, the authentication engine sends the token, time factor, and token ID to a token authentication service provider for validation of the token. In step 525, authentication engine sends the voice sample to a voice authentication service provider for verification of the user's voice. In step 530, the authentication engine determines whether the user is authenticated based on the information received from the token authentication service provider and the voice authentication service provider and authenticates the user or denies the authentication request.

Figure 6:
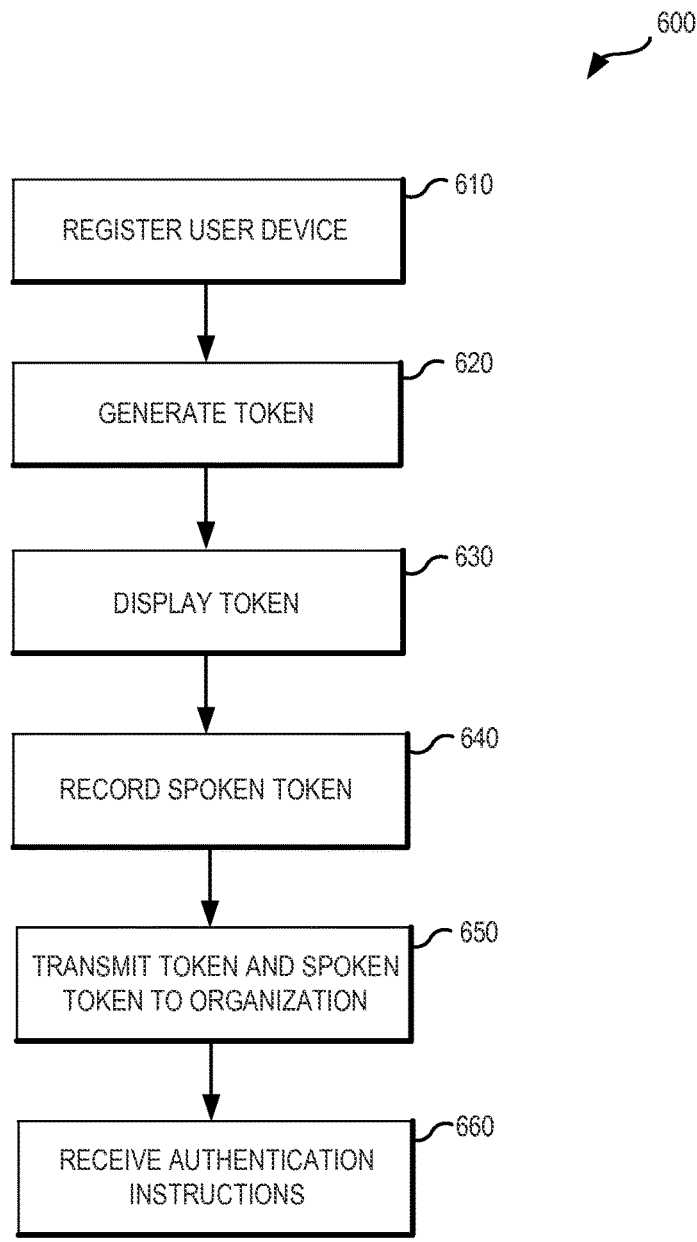
FIG. 6 is a flowchart illustrating a set of operations for authenticating a user in accordance with some embodiments of the present disclosure.

FIG. 6 is a flow chart illustrating a set of operations 600 for authenticating a user in accordance with some embodiments of the present disclosure. The operations illustrated in FIG. 6 may be performed by one or more components, devices, or modules such as, but not limited to, computing devices 110A-110M, operating system 215, application 220, registration module 225, token generator 230, biometric sample collecting module 235, communications module 240, and graphical user interface (GUI) module 245, or other components or device. In some embodiments, fewer than all of the steps are performed, whereas in other embodiments additional operations are performed. Moreover, in some embodiments, the operations may be performed in different orders.

Registering operation 610 registers the user device for multi-factor authentication. In some embodiments, registration may include the user device installing a token generator. The token generator may have an associated token ID. Registering operation 610 may further include an authentication engine associating the token ID with the user device and storing the token ID.

In some embodiments, registration may include requesting the user to provide biometric samples during the registration process. The biometric samples may include anything that a user can do to uniquely identify herself. For example, registration operation 610 may include collecting voice samples of the user saying specific words and/or phrases several times. Registration operation 610 may also include recording eye movement of the user reading possible tokens or portions of tokens several times. Blinking patterns may be included. The user's typing or writing characteristics may be captured (e.g., speed). A video of the person speaking, typing, or looking at the person may be recorded. In further examples, an ear print on a touch screen or a speed at which a web page is surfed may be used to uniquely identify a person.

In some embodiments, during registration, the user selects the type of biometric sample to be used during authentication. In other embodiments, the organization collects various biometric samples and recommends the sample that will work best from an authentication standpoint for that user (e.g., is the user's voice very distinctive, does the user's eyes move in a distinctive pattern, etc.). In some embodiments, the user can engage in a quick registration process in which only one sample is provided and later during a full registration process provide additional samples or additional samples may be collected through use of the application. After a quick registration process is completed, the voice biometric registration may be strengthened over time as the user is verified using voice biometrics.

Generating operation 620 generates a token (e.g, a one-time token) when the user attempts to access an application or website or requests to perform an activity associated with an organization. The token that is generated may depend on the token ID. Generation may require a shared secret and/or a time factor. Once the token is generated, the token is displayed on the user computing device in displaying operation 630. Recording operation 640 records audio signals of the user speaking the token aloud into the computing device. In some embodiments, a file of the recording is created. Transmitting operation 650 transmits the token and a file with the recording or audio signals (in real-time or delayed) to an authentication engine.

After the authentication engine and service providers have received the authentication request and the associated information, the information is analyzed to determine whether the user can be authenticated. For example, the user may be authenticated when the token is verified (thus verifying the device) and when the user's voice is verified (thus verifying the user). Receiving operation 660 receives authentication instructions indicating whether the user is authenticated or denied access, or whether the user needs to provide additional credentials.

Figure 7:
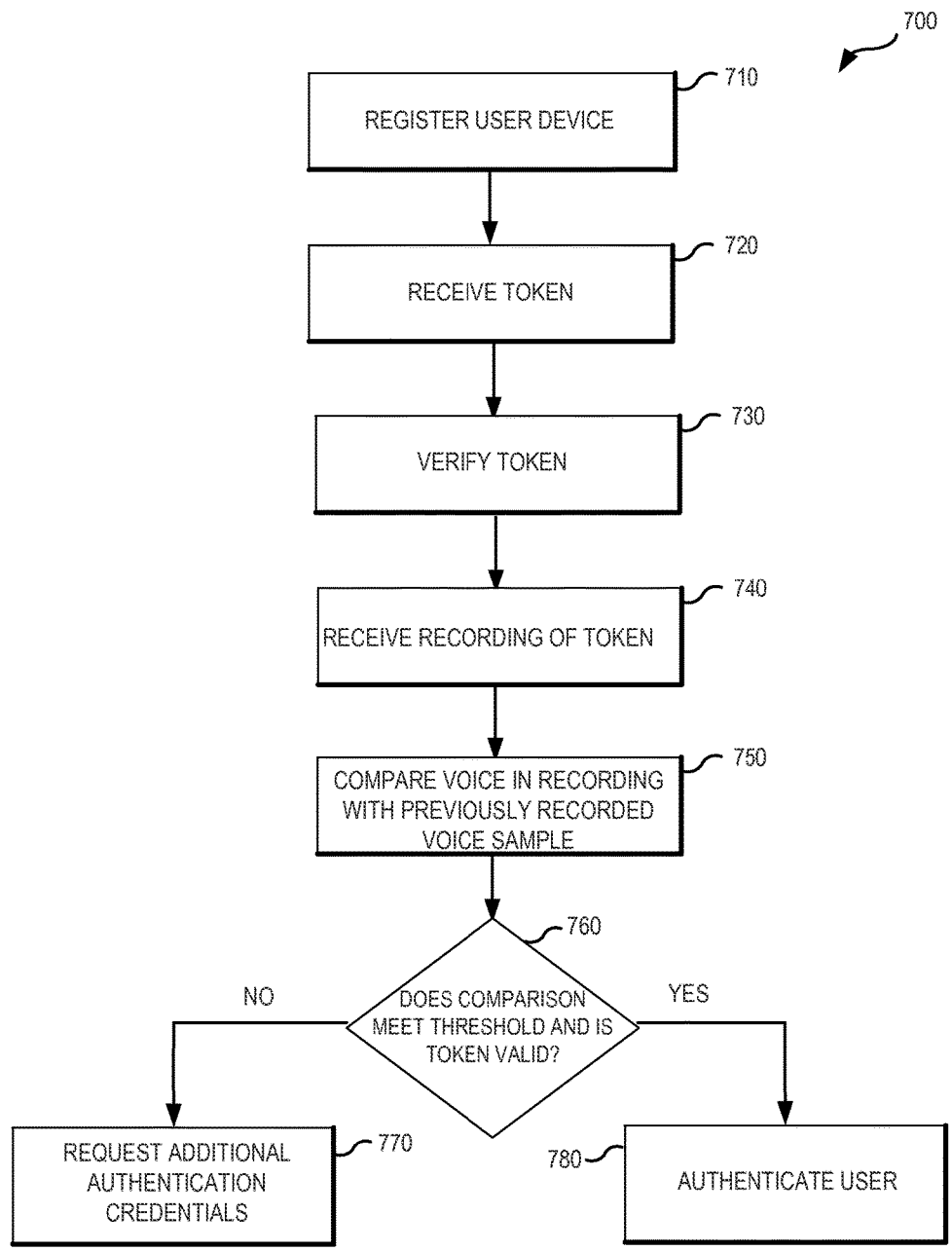
FIG. 7 is a flowchart illustrating a set of operations for authenticating a user in accordance with some embodiments of the present disclosure.

FIG. 7 is a flowchart illustrating a set of operations 700 for authenticating a user in accordance with some embodiments of the present disclosure. The operations illustrated in FIG. 7 may be performed by one or more components, devices, or modules such as, but not limited to, computing devices 110A-110M, authentication engine 120, memory 305, processors 310, registration module 315, authentication request receiving module 320, token verification module 325, biometric comparison module 330, authenticator 335, credential requesting module 340, and GUI generation module 345, or other components or device. In some embodiments, fewer than all of the steps are performed, whereas in other embodiments additional operations are performed. Moreover, in some embodiments, the operations may be performed in different orders.

Registering operation 710 registers the user device with the organization. During registration, a user device may be provided with a token generator to generate tokens during future authentication processes. In some embodiments, the registration process includes authenticating the user, receiving an activation code for a token generator from a service provider, sending the activation code to the user device, receiving a token ID associated with the token generator, associating the token ID with the user and user device, and sending a display name to the user device.

Registering operation 710 may further include receiving biometric samples from the user. For example, during registration the user may be asked to provide voice samples of words that may be spoken during authentication. In some examples, the user is asked to speak the numbers zero to nine several times. The user's voice speaking these particular words may be stored and analyzed for patterns and characteristics and may be used to authenticate the user during future authentication requests.

Receiving token operation 720 receives a token and a time stamp associate with the token from the user device. The token may be generated using the token generator. Using the token ID and a time stamp, the token may be verified in verifying operation 730. In some embodiments, a third party may verify the token and in other embodiments, the authentication engine verifies the token.

Receiving biometrics operation 740 receives a biometric sample of the user from the user computing device such as a recording, file, or real-time transmission of a voice speaking the token out loud. The recording, file or real-time transmission may be received from the user device. Comparing operation 750 may compare the spoken version of the token to the user's previously spoken voice samples. In some embodiments, the token includes the words that the user spoke during the registration process, making for a more accurate voice comparison.

Comparing operation 750 compares the voice sent from the user device with the voice in the previously recorded voice samples to determine how closely the voices match. In some embodiments, a threshold of a match required is predetermined. In other embodiments, the threshold may vary with the user, activity, or other factors. Comparing operation 750 may determine how closely the voices match. The comparison may be expressed as a percentage.

Determining operation 760 determines whether the comparison meets the threshold to validate the user's voice and whether the token is valid. Authenticating operation 780 authenticates the user in authenticating operation 780 when the user's voice and device are validated. Authentication operation 780 may send instructions to the user's computing device to allow the user to proceed when the user's credentials are validated for authentication. Alternatively, when the voice comparison does not meet or exceed the threshold and/or when the token is determined to be invalid, requesting operation 770 requests additional authentication credentials from the user or declines the user access. Additional credentials may include additional biometric information, answers to security questions, username/password/PIN, or other information. The additional credentials may be analyzed. An authentication decision may be determined or the authentication request may be denied.

In the flow of FIG. 7, the user is authenticated when the voice comparison meets or exceeds the threshold and when the token is determined to be valid. In other embodiments, the device only needs to be validated. In some cases, validation of the factors may be a sliding scale based on a confidence level of the user's identity. For example, if the user's voice is validated as a near perfect match, the device may not need to be validated. In other embodiments, when the user's voice does not match at all, the user's device may be located (using e.g., geolocation) to determine if the user is in an expected location for that user. The location information may be used to supplement the device verification to authenticate the user. In other embodiments, if either the biometrics or the device cannot be validated, the user may use traditional methods of authentication (e.g., username/password, PIN, etc.).

Embodiments of the present disclosure may be used to continuously authenticate a user throughout a session with an organization. The user may be authenticated to various activities performed within the session In various embodiments of the disclosure, spoken commands may be used to authenticate the user. For example, when a user is speaking with a representative or an interactive voice response system, the user's voice characteristics of a certain command may be analyzed and compared to the voice characteristics of previously analyzed and recorded samples of the user speaking the command to authenticate the user. Various commands, such as "Transfer funds" may be spoken repeatedly by the user over many phone calls such that over time, the organization will be capable of generating an accurate model of the particular way in which the user speaks the command. These spoken commands may be used to authenticate the user. Various thresholds on matches may depend on the user's historical behavior with that type of activity (e.g., does the user typically state this command) and on the riskiness of the activity, as well as other factors.

Computer System Overview

Figure 8:
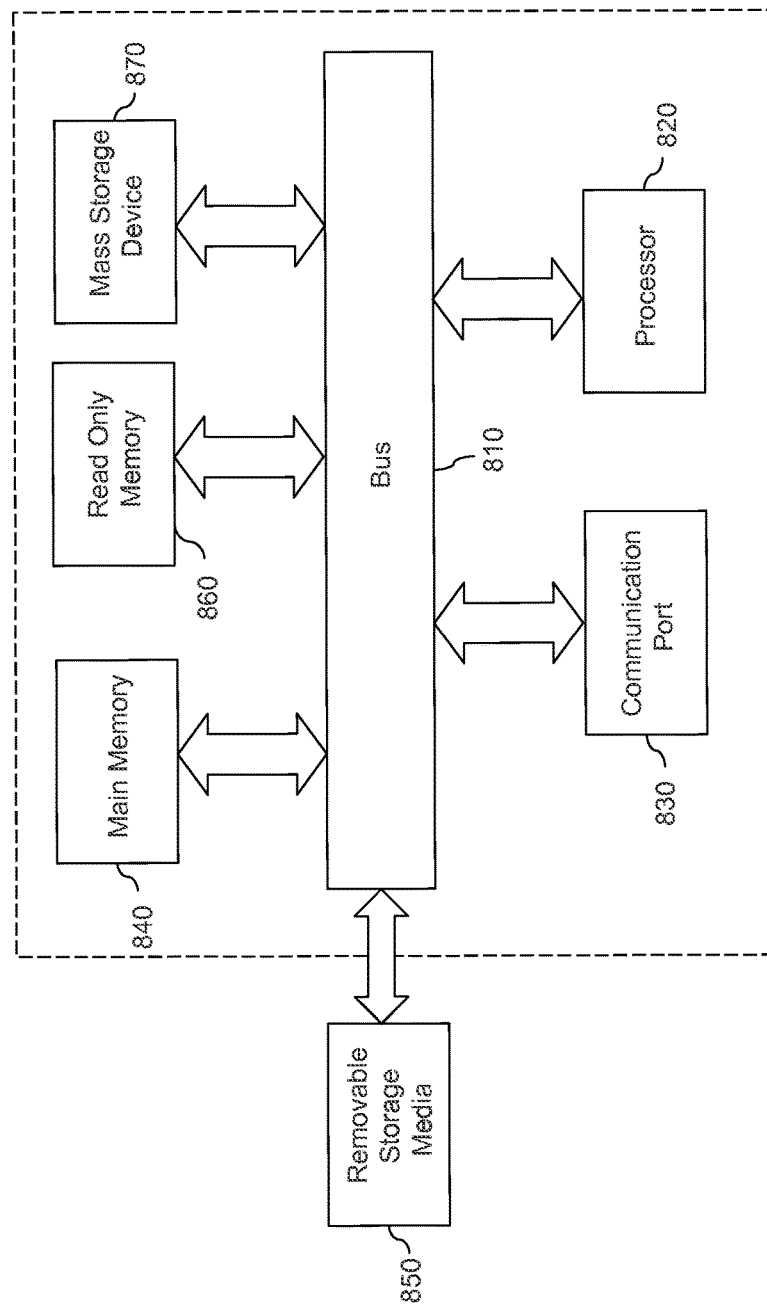
FIG. 8 illustrates an example of a computer system with which some embodiments of the present disclosure may be utilized.

Embodiments of the present disclosure include various steps and operations, which have been described above. A variety of these steps and operations may be performed by hardware components or may be embodied in machine-executable instructions, which may be used to cause a general-purpose or special-purpose processor programmed with the instructions to perform the steps. Alternatively, the steps may be performed by a combination of hardware, software, and/or firmware. As such, FIG. 8 is an example of a computer system 800 with which embodiments of the present disclosure may be utilized. According to the present example, the computer system 800 includes a bus 810, at least one processor 820, at least one communication port 830, a main memory 840, a removable storage media 850, a read only memory 860, and a mass storage 870.

Processor(s) 820 can be any known processor, such as, but not limited to, an Intel® Itanium® or Itanium 2® processor(s), or AMD® Opteron® or Athlon MP® processor(s), or Motorola® lines of processors. Communication port(s) 830 can be any of an RS-232 port for use with a modem-based dialup connection, a 10/100 Ethernet port, or a Gigabit port using copper or fiber. Communication port(s) 830 may be chosen depending on a network such a Local Area Network (LAN), Wide Area Network (WAN), or any network to which the computer system 800 connects.

Main memory 840 can be Random Access Memory (RAM), or any other dynamic storage device(s) commonly known in the art. Read only memory 860 can be any static storage device(s) such as Programmable Read Only Memory (PROM) chips for storing static information such as instructions for processor 820.

Mass storage 870 can be used to store information and instructions. For example, hard disks such as the Adaptec® family of SCSI drives, an optical disc, an array of disks such as RAID, such as the Adaptec family of RAID drives, or any other mass storage devices may be used.

Bus 810 communicatively couples processor(s) 1020 with the other memory, storage, and communication blocks. Bus 810 can be a PCI/PCI-X or SCSI based system bus depending on the storage devices used.

Removable storage media 850 can be any kind of external hard-drives, floppy drives, IOMEGA® Zip Drives, Compact Disc-Read Only Memory (CD-ROM), Compact Disc-Re-Writable (CD-RW), Digital Video Disc-Read Only Memory (DVD-ROM).

The components described above are meant to exemplify some types of possibilities. In no way should the aforementioned examples limit the disclosure, as they are only exemplary embodiments.

Terminology

Brief definitions of terms, abbreviations, and phrases used throughout this application are given below.

The terms "connected" or "coupled" and related terms are used in an operational sense and are not necessarily limited to a direct physical connection or coupling. Thus, for example, two devices may be coupled directly, or via one or more intermediary media or devices. As another example, devices may be coupled in such a way that information can be passed therebetween, while not sharing any physical connection with one another. Based on the disclosure provided herein, one of ordinary skill in the art will appreciate a variety of ways in which connection or coupling exists in accordance with the aforementioned definition.

The phrases "in some embodiments," "according to some embodiments," "in the embodiments shown," "in other embodiments," "embodiments," and the like generally mean the particular feature, structure, or characteristic following the phrase is included in at least one embodiment of the present disclosure, and may be included in more than one embodiment of the present disclosure. In addition, such phrases do not necessarily refer to the same embodiments or different embodiments.

If the specification states a component or feature "may," "can," "could," or "might" be included or have a characteristic, that particular component or feature is not required to be included or have the characteristic.

The term "responsive" includes completely or partially responsive.

The term "module" refers broadly to a software, hardware, or firmware (or any combination thereof) component. Modules are typically functional components that can generate useful data or other output using specified input(s). A module may or may not be self-contained. An application program (also called an "application") may include one or more modules, or a module can include one or more application programs.

The term "network" generally refers to a group of interconnected devices capable of exchanging information. A network may be as few as several personal computers on a Local Area Network (LAN) or as large as the Internet, a worldwide network of computers. As used herein, "network" is intended to encompass any network capable of transmitting information from one entity to another. In some cases, a network may be comprised of multiple networks, even multiple heterogeneous networks, such as one or more border networks, voice networks, broadband networks, financial networks, service provider networks, Internet Service Provider (ISP) networks, and/or Public Switched Telephone Networks (PSTNs), interconnected via gateways operable to facilitate communications between and among the various networks.

Also, for the sake of illustration, various embodiments of the present disclosure have herein been described in the context of computer programs, physical components, and logical interactions within modern computer networks. Importantly, while these embodiments describe various embodiments of the present disclosure in relation to modern computer networks and programs, the method and apparatus described herein are equally applicable to other systems, devices, and networks as one skilled in the art will appreciate. As such, the illustrated applications of the embodiments of the present disclosure are not meant to be limiting, but instead are examples. Other systems, devices, and networks to which embodiments of the present disclosure are applicable include, but are not limited to, other types of communication and computer devices and systems. More specifically, embodiments are applicable to communication systems, services, and devices such as cell phone networks and compatible devices. In addition, embodiments are applicable to all levels of computing from the personal computer to large network mainframes and servers.

In conclusion, the present disclosure provides novel systems, methods, and arrangements for authenticating a user. While detailed descriptions of one or more embodiments of the disclosure have been given above, various alternatives, modifications, and equivalents will be apparent to those skilled in the art without varying from the spirit of the disclosure. For example, while the embodiments described above refer to particular features, the scope of this disclosure also includes embodiments having different combinations of features and embodiments that do not include all of the described features. Accordingly, the scope of the present disclosure is intended to embrace all such alternatives, modifications, and variations as fall within the scope of the claims, together with all equivalents thereof. Therefore, the above description should not be taken as limiting.

What is claimed is:

1. A method of authenticating a user, comprising:
   receiving, at an authentication engine from a first computing device via a communications network, a first request, the first request being a request to register the first computing device, wherein the authentication engine is implemented on at least one server computing device distinct from the first computing device;
   in response to receiving the first request:
     transmitting, using the authentication engine via the communications network, a second request, the second request being a request for user authentication information to the first computing device,
     retrieving, using the authentication engine via the communications network, an activation code from a second computing device, and transmitting, using the authentication engine via the communications network, the activation code to the first computing device;

receiving, at the authentication engine, user authentication information from the first computing device;

receiving, at the authentication engine via the communications network, an identifier of a token generator on the first computing device from the first computing device, wherein the token identifier of the token generator was transmitted from the second computing device to the first computing device in response to the first computing device providing the activation code to the second computing device;

associating, at the authentication engine, the identifier of the token generator with a user of the first computing device;

transmitting, using the authentication engine via the communications network, an identifier of the user to the first computing device;

receiving at the authentication engine, via the communications network from the first computing device, a one-time token initially generated on the by the token generator and a recording of the one-time token read aloud by the user generated on the first computing device;

comparing, at the authentication engine, voice characteristics derived from the recording of the one-time token with voice characteristics derived from one or more samples of the user's voice;

verifying the one-time token at the authentication engine; and authenticating, at the authentication engine, the user when the one-time token is verified and when a match of the voice characteristics derived from the recording of the one-time token and the voice characteristics derived from the one or more samples of the user's voice meet or exceed a threshold.

2. The method of claim 1, wherein the one-time token is generated on the first computing device using a unique identifier stored on the first computing device and a time stamp.

3. The method of claim 1, further comprising verifying the first computing device or an additional device associated with the user, wherein the first computing device or the additional device associated with the user is verified using the one-time token.

4. The method of claim 3, further comprising:
receiving, with the one-time token, the identifier of the token generator and a time stamp associated with the one-time token; and
identifying the user based on the identifier of the token generator.

5. The method of claim 4, further comprising:
communicating the identifier of the token generator and the time stamp to a service provider; and
receiving, from the service provider, an indication that the one-time token is valid.

6. The method of claim 1, wherein the one or more samples of the user's voice includes one or more recordings of the user reading aloud at least a portion of the one-time token, wherein the method further includes generating, from the one or more recordings, a model of voice characteristics of the user speaking the at least the portion of the one-time token.

7. The method of claim 1, wherein the one-time token is a series of numbers or a phrase.

8. The method of claim 1, further comprising:
determining that the match of the voice characteristics derived from the recording of the one-time token and the voice characteristics derived from the one or more samples of the user's voice do not meet or exceed the threshold, and
responsive to determining the match of the voice characteristics derived from the recording of the one-time token and the voice characteristics derived from the one or more samples of the user's voice do not meet or exceed the threshold, requesting the user to provide the user authentication information.

9. The method of claim 8, wherein the user authentication information includes a personal identification number, behavioral biometrics, or physical biometrics.

10. The method of claim 8, further comprising, responsive to determining the match of the voice characteristics derived from the recording of the one-time token and the voice characteristics derived from the one or more samples of the user's voice do not meet or exceed the threshold, requesting the user to read the one-time token out loud a second time.

11. The method of claim 1, further comprising:
determining that the match of the voice characteristics derived from the recording of the one-time token and the voice characteristics derived from the one or more samples of the user's voice do not meet or exceed the threshold, and
responsive to determining that the match of the voice characteristics derived from the recording of the one-time token and the voice characteristics derived from the one or more samples of the user's voice do not meet or exceed the threshold, collecting information passively to authenticate the user.

12. The method of claim 11, wherein the information includes a location of the user.

13. The method of claim 1, further comprising:
denying authentication when the match of the voice characteristics derived from the recording of the one-time token and the voice characteristics derived from the one or more samples of the user's voice is below the threshold.

14. The method of claim 1, wherein the threshold is based at least in part on a type of activity requested by the user.

15. The method of claim 1, wherein the first computing device is a mobile device.

16. The method of claim 1, wherein the communications network comprises one or more local area network or wide area networks.

17. The method of claim 1, wherein the one-time token is generated based on the identifier of the token generator.

18. The method of claim 17, wherein the identifier of the token generator is used as an input by the token generator to generate the one-time token.

19. The method of claim 17, wherein the identifier of the token generator is a serial number of the token generator.

20. The method of claim 1, wherein associating the identifier of the token generator with the user of the first computing device comprises identifying the user based on the user authentication information received from the first computing device.

21. The method of claim 1, wherein the token generator was transmitted from the second computing device to the first computing device response to the first computing device providing the activation code to the second computing device.

22. A non-transitory, computer-readable medium, the non-transitory computer-readable medium having computer-readable instructions stored thereon, which, when executed by one or more processors, direct the one or more processors to:

receive, at an authentication engine from a first computing device via a communications network, a first request, the first request being a request to register the first computing device, wherein the authentication engine is implemented on at least one server computing device distinct from the first computing device;

in response to receiving the first request:

transmit, using the authentication engine via the communications network, a second request, the second reuquest being a request for user authentication information to the first computing device, retrieve, using the authentication engine via the communications network, an activation code from a second computing device, and transmit, using the authentication engine via the communications network, the activation code to the first computing device;

receive, at the authentication engine, user authentication information from the first computing device;

receive, at the authentication engine via the communications network, an identifier of a token generator on the first computing device from the first computing device, wherein the token identifier of the token generator was transmitted from the second computing device to the first computing device in response to the first computing device providing the activation code to the second computing device;

associate, at the authentication engine, the identifier of the token generator with a user of the first computing device;

transmit, using the authentication engine via the communications network, an identifier of the user to the first computing device;

receive, at the authentication engine, via the communications network from the first computing device, a biometric sample collected at the first computing device that incorporates a token dynamically and initially generated by the token generator;

compare, at the authentication engine, the biometric sample that includes the dynamically generated token with at least one previously collected biometric sample; and authenticate, at the authentication engine, the user when the first computing device is verified and when the user is verified through a match of the biometric sample and the at least one previously collected biometric sample, wherein the match is determined by a threshold.

23. The non-transitory, computer-readable medium of claim 22, wherein the first computing device is verified using the dynamically generated token.

24. The non-transitory, computer-readable medium of claim 22, wherein the threshold is determined at least in part by a type of activity the user is requesting.

25. The non-transitory, computer-readable medium of claim 22, wherein the match of the biometric sample and the previously collected biometric sample is a match of characteristics derived from the biometric sample and characteristics derived from the at least one previously collected biometric sample.

26. A method of authenticating a user, comprising:

transmitting, from a first computing device to an authentication engine via a communications network, a first request, the first request being a request to register the first computing device, wherein the authentication engine is implemented on at least one server computing device distinct from the first computing device;

receiving, at the first computing device from the authentication engine via the communications network, a second request, the second request being a request for user authentication information;

in response to receiving the second request, transmitting, from the first computing device to the authentication engine via the communications network, user authentication information;

receiving, at the first computing device from the authentication engine via the communications network, an activation code, wherein the activation code was retrieved by the authentication engine from a second computing device;

in response to receiving the activation code, transmitting the activation code from the first computing device to the second computing device via the communications network;

receiving, at the first computing device from the second computing device via the communications network, an identifier of a token generator on the first computing device;

in response to receiving the identifier of the token generator, transmitting the identifier of the token generator from the first computing device to the authentication engine via the communications network;

displaying, on the first computing device, a one-time token initially generated on the first computing device, wherein the one-time token is to be read aloud by the user;

generating, on the first computing device, a file including a recording of the one-time token read aloud by the user; and transmitting, to the authentication engine, the one-time token and the recording of the one-time token read aloud by the user;

wherein the authentication engine verifies the one-time token and compares voice characteristics derived from the recording of the one-time token with voice characteristics derived from one or more vocal interactions with the user, and wherein the user is authenticated by the authentication engine when the voice characteristics derived from the recording of the one-time token match the voice characteristics derived from the one or more vocal interactions with the user.

27. The method of claim 26, further comprising generating the one-time token on the first computing device using a token generator, wherein the token generator generates the token using a unique identifier and a time stamp.

28. The method of claim 26, wherein the one-time token is used to verify the first computing device.

29. The method of claim 26, wherein the one or more vocal interactions with the user include one or more samples of the user speaking aloud at least a portion of the one-time token, wherein the method further includes generating a model of voice characteristics of the user speaking the at least the portion of the one-time token.

30. The method of claim 26, wherein the one-time token is a series of numbers or a phrase, wherein a threshold is based on a risk level of an activity requested by the user.

* * * * *

UNITED STATES PATENT AND TRADEMARK OFFICE
CERTIFICATE OF CORRECTION

PATENT NO. : 9,928,839 B1
APPLICATION NO. : 14/254504
DATED : March 27, 2018
INVENTOR(S) : Michael Wayne Lester et al.

It is certified that error appears in the above-identified patent and that said Letters Patent is hereby corrected as shown below:

In the Claims

Column 21, Line 13, Claim 22, delete "reuquest" and insert -- request --, therefor.

Signed and Sealed this
Seventeenth Day of July, 2018

Andrei Iancu
*Director of the United States Patent and Trademark Office*